United States Patent
Singhal (10) Patent No.: US 8,242,651 B2
(45) Date of Patent: Aug. 14, 2012

(54) SELF-CONTAINED BEARING LUBRICATION SYSTEM OPERATING ON OIL RING LUBRICATED BY NOZZLE

(75) Inventor: Sumit Singhal, Cincinnati, OH (US)

(73) Assignee: Siemens Industry, Inc., Alpharetta, GA (US)

( * ) Notice: Subject to any disclaimer, the term of this patent is extended or adjusted under 35 U.S.C. 154(b) by 448 days.

(21) Appl. No.: 12/567,387

(22) Filed: Sep. 25, 2009

(65) Prior Publication Data

US 2011/0074236 A1    Mar. 31, 2011

(51) Int. Cl.
 F16C 1/24    (2006.01)
 F16C 3/14    (2006.01)
 F16C 5/00    (2006.01)
 F16C 33/10   (2006.01)
 F16C 33/16   (2006.01)

(52) U.S. Cl. .......... 310/90; 384/403; 384/404; 384/405; 384/406

(58) Field of Classification Search .......... 384/403–406; 310/90; F16C 1/24, 3/14, 5/00, 33/10, 33/16
See application file for complete search history.

(56) References Cited

U.S. PATENT DOCUMENTS

| | | | |
|---|---|---|---|
| 1,005,358 A | 10/1911 | Symons | |
| 2,053,425 A * | 9/1936 | Else | 310/90 |
| 2,861,652 A | 11/1958 | Small | |
| 3,089,046 A | 5/1963 | Jaeschke | |
| 3,240,424 A | 3/1966 | Richardson | |
| 3,241,763 A * | 3/1966 | MacCracken | 237/2 R |
| 3,720,288 A | 3/1973 | Tschabold | |
| 5,499,902 A * | 3/1996 | Rockwood | 415/113 |
| 5,711,615 A | 1/1998 | Stitz et al. | |
| 6,460,656 B1 * | 10/2002 | Jones et al. | 184/13.1 |
| 6,820,419 B2 * | 11/2004 | Ford et al. | 60/310 |
| 2005/0257766 A1 * | 11/2005 | Rau et al. | 123/195 C |
| 2007/0242908 A1 * | 10/2007 | Nakajima et al. | 384/112 |
| 2008/0007143 A1 * | 1/2008 | Nakamura et al. | 310/358 |

* cited by examiner

Primary Examiner — Quyen Leung
Assistant Examiner — Terrance Kenerly (57) ABSTRACT

A lubrication system for an electrodynamic machine including therein an internal oil sump and at least one oil ring hydrodynamic bearing, wherein the oil ring is in fluid communication with oil, in the sump and replenishes oil in the bearing. The lubrication system includes an electrically powered oil sump pump that is oriented within the sump. An of intake is coupled to the pump and is in fluid communication with oil in the internal sump. An oil discharge line is coupled to the pump discharge. The distal end of the discharge line is oriented proximal the motor bearing, so that oil discharged therefrom replenishes oil in the bearing and shaft journal interface. The lubrication system oil discharge parameters are independent, of the motor speed, load or physical orientation, and may be varied by a controller coupled to the oil sump pump.

20 Claims, 6 Drawing Sheets

SELF-CONTAINED BEARING LUBRICATION SYSTEM OPERATING ON OIL RING LUBRICATED BY NOZZLE

BACKGROUND OF THE DISCLOSURE

1. Field of the Invention

The invention relates to dynamoelectric machine bearing lubrication systems and in particular to self-contained supplemental lubrication systems for oil ring lubricated hydrodynamic bearings utilized in induction motors.

2. Description of the Prior Art

Electrodynamic machines, such as horizontal shaft induction motors, have rotating shafts restrained by rolling element, hydrodynamic or hydrostatic bearings. Hydrodynamic bearings generate a self-sustaining pressurized lubricant liquid film interface between the bearing surface and the corresponding shaft journal. Lubricant forming the lubricant film needs to be refreshed to replace that which is inevitably squeezed out of the bearing/journal interface due to their relative rotation. Oil replenishment also conveniently transfers heat generated within the interface or by thermal gradient transfer between the surfaces away from the bearing, for example to a sump. For brevity, lubricant will hereafter be referred to as oil, as it is a commonly used industrial lubricant.

It is known and common in the induction motor arts to employ oil ring lubricated hydrodynamic bearings to support and constrain the rotating shaft. The hydrodynamic bearings are often contained in a bearing block portion of a bearing housing mounted on both axial ends of the motor. The bearing housing in cooperation with the motor housing forms an oil sump having a maximum fluid fill level below the motor shaft and bearing, so that the shaft does not come in direct contact with the sump oil. The bearing includes one or more axially or laterally restrained annular oil rings that capture the motor shaft journal within its inner cylindrical surface. The oil ring is in direct contact with the motor shaft journal at the ring's approximately 12 o'clock upper position. The lower portion of the oil ring proximal its 6 o'clock lower position is dipped into the oil within the sump. Often the oil ring has a grooved or otherwise textured surface to enhance friction contact with the shaft journal. Motor shaft rotation imparts oil ring rotation. As the oil ring rotates, it carries and transports an oil film on its surface from the sump oil and deposits the oil into the bearing as the previously dipped portion rotates from its prior 6 o'clock position to a new 12 o'clock position in contact with the shaft journal.

An oil ring's oil transfer rate from the sump to the shaft journal bearing is a function of and proportional to shaft rotation speed. Under low RPM, high load conditions the oil rings may not be able to maintain a desired oil transfer rate from the sump to the bearing. Conversely under high RPM conditions, oil may be slung off the ring due to centrifugal forces before a sufficient quantity can reach the bearing during the rotational trip from sump to bearing.

Additional oil ring oil transfer rate challenges are posed by induction motors that operate in non-stationary, relative motion environments, such as in marine vessels, locomotives, cranes and mining drag lines. In such applications the oil sump often is not maintained in a level condition so that the sump fluid level is at optimal height relative to the oil ring, bearing and shaft. When a motor is caused to roll, pitch or yaw relative to horizontal the oil ring may no longer be in contact with sump oil, because the oil flows to assume a new horizontal position within the motor housing.

Thus, a need exists in the art for a hydrodynamic bearing oil ring lubrication system that provides a desired oil transfer flow rate from the oil sump to the bearing that is not dependent on motor shaft rotation speed or orientation of the oil level in the sump relative to the oil ring.

One common past solution for these needs has been to dispose of the oil ring lubrication system entirely and substitute pressurized oil transport galleries in the motor housing and bearing housings that directly feed pressurized oil to the bearings, often with external oil sumps and pumps. Such solutions add manufacturing and maintenance costs to the motor that may be unacceptable in some applications. Additional bearing oil galleries and external sump systems are not easily reconfigured in presently manufactured induction motor designs that already incorporate oil rings and they are not easily retrofitted in the field or shop for motors already in operation.

In the past other oil delivery solutions have been used for hydrodynamic journal bearings in general, but they are not suitable for application to induction motors. Capillary tubes, employing sumps located above the bearing have been used to replenish bearing oil, but the sump must be refilled as it empties: by hand maintenance or through an auxiliary pump. Gravity fed capillary tubes may not be suitable for application in moving vehicles as their sumps may not always be oriented above the bearing.

Journal boxes incorporating oil-soaked felt, rock wool or the like, alone or in combination with capillary tubes have been utilized in the past in axle bearings of railroad vehicles and the like, but as with capillary tubes they are not readily suitable for application in moving vehicle induction motors. Journal boxes are unlikely to maintain oil delivery flow rates required by electric induction motors and other electrodynamic machines.

Another known oil delivery system for combined hydrodynamic/hydrostatic bearings is set forth in U.S. Pat. No. 3,720,288 as a lubrication solution for open bearing journal construction in large grinding mills. The '288 patent states that oil may be discharged directly on the exposed trunnion journal with an overhead delivery pipe supplied by an external sump and low pressure pump when the grinding mill is in normal operating mode. The lubrication system switched to pressurized hydrostatic bearing mode when the crusher transitioned to start or stop cycles. Such an oil delivery system as shown in the '288 patent is not readily applicable to a closed housing induction motor, nor would one skilled in the art today encourage potential open, unrestrained discharge of oil into the environment.

SUMMARY OF THE INVENTION

Accordingly, an object of the present invention is to enhance and supplement existing hydrodynamic oil ring bearing designs used in induction motors, so that the oil feed rate from the motor's internal sump to the bearings can be selectively regulated under any motor operating condition or in any relative orientation between the oil sump horizontal fill level and the oil ring that is caused by motor motion.

It is another object of the present invention to be able to incorporate the present invention in existing induction motor designs having oil rings and internal oil sumps without significant motor redesign or retrofitting effort.

These and other objects are achieved in accordance with the present invention by orienting a supplemental pressurized oil spray on the bearing in addition and parallel to the existing oil ring oil supply. Pressurized oil is supplied by a sump pump placed within the induction motor's existing internal oil sump that is coupled to a sump pump discharge line. The discharge line may feed oil directly to the bearing, analogous to a water hose spray. Alternatively the oil discharge may be altered to a desired spray pattern with a nozzle, orifice, injector or other flow pattern changing and regulating device. External sumps and pumps may be employed in parallel to or in replacement of the sump pump that is resident in the motor's internal sump.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of my invention can be readily utilized in electrodynamic machines including induction motors that incorporate hydrodynamic bearings with oil ring and internal sump lubrication systems. The present invention lubrication system functions in parallel with the motor's existing oil ring lubrication system.

Existing Oil Ring Lubrication System

Figure 1:
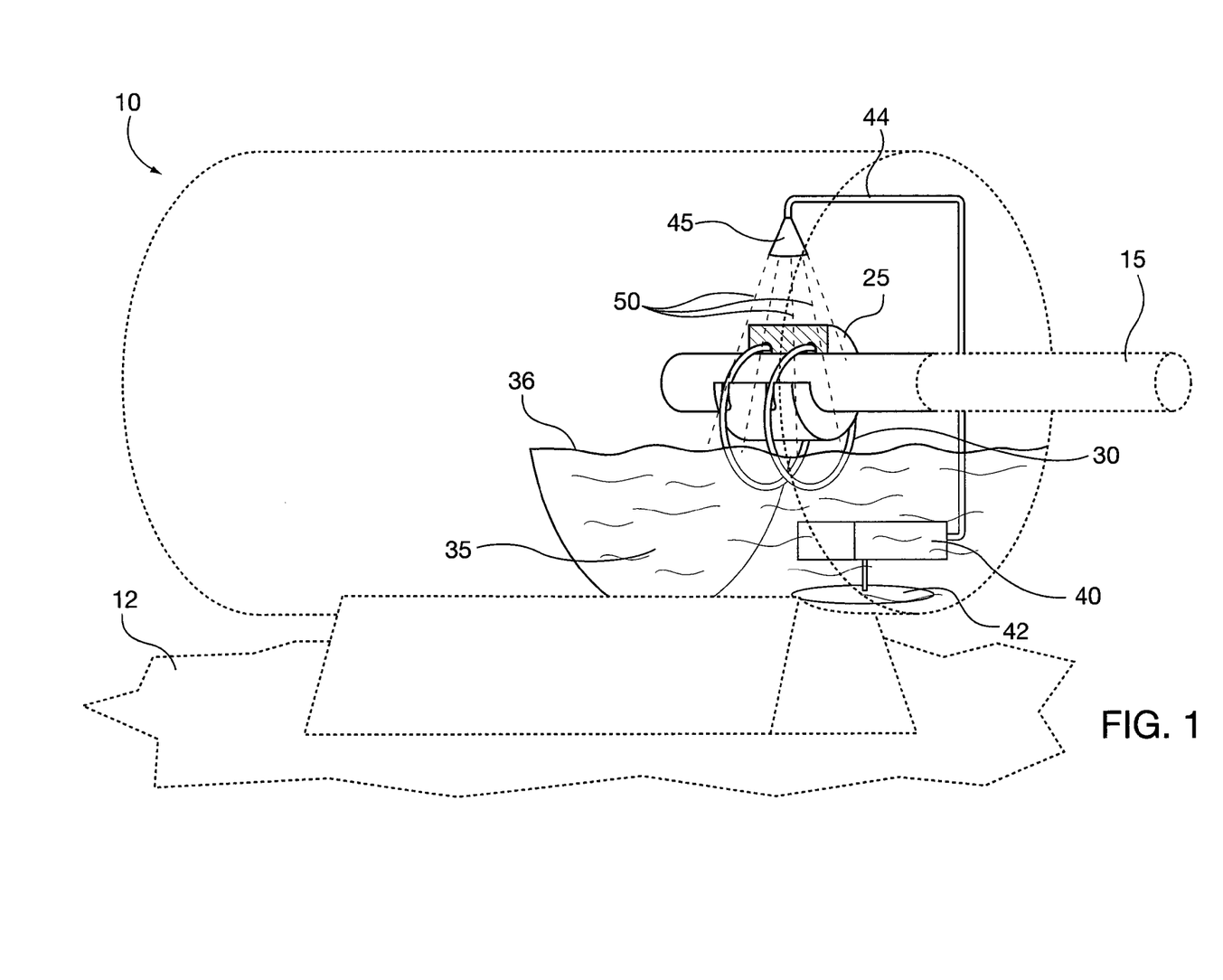
FIG. 1 shows a simplified schematic perspective view of the bearing lubrication system of the present invention as incorporated in an idealized exemplary induction motor, with the motor shown in phantom.

FIG. 1 shows an exemplary induction motor 10 electrodynamic machine mounted on a deck surface 12. The deck surface 12 may be stationary, for example mounted to a factory building floor or in a moving object, for example a marine vessel, railroad locomotive, construction crane or mining drag line. The motor 10 is shown in phantom line drawing, because its electrodynamic components are of known construction. The motor 10 has a rotating shaft 15 that converts electrical energy to rotating mechanical energy.

Figure 2:
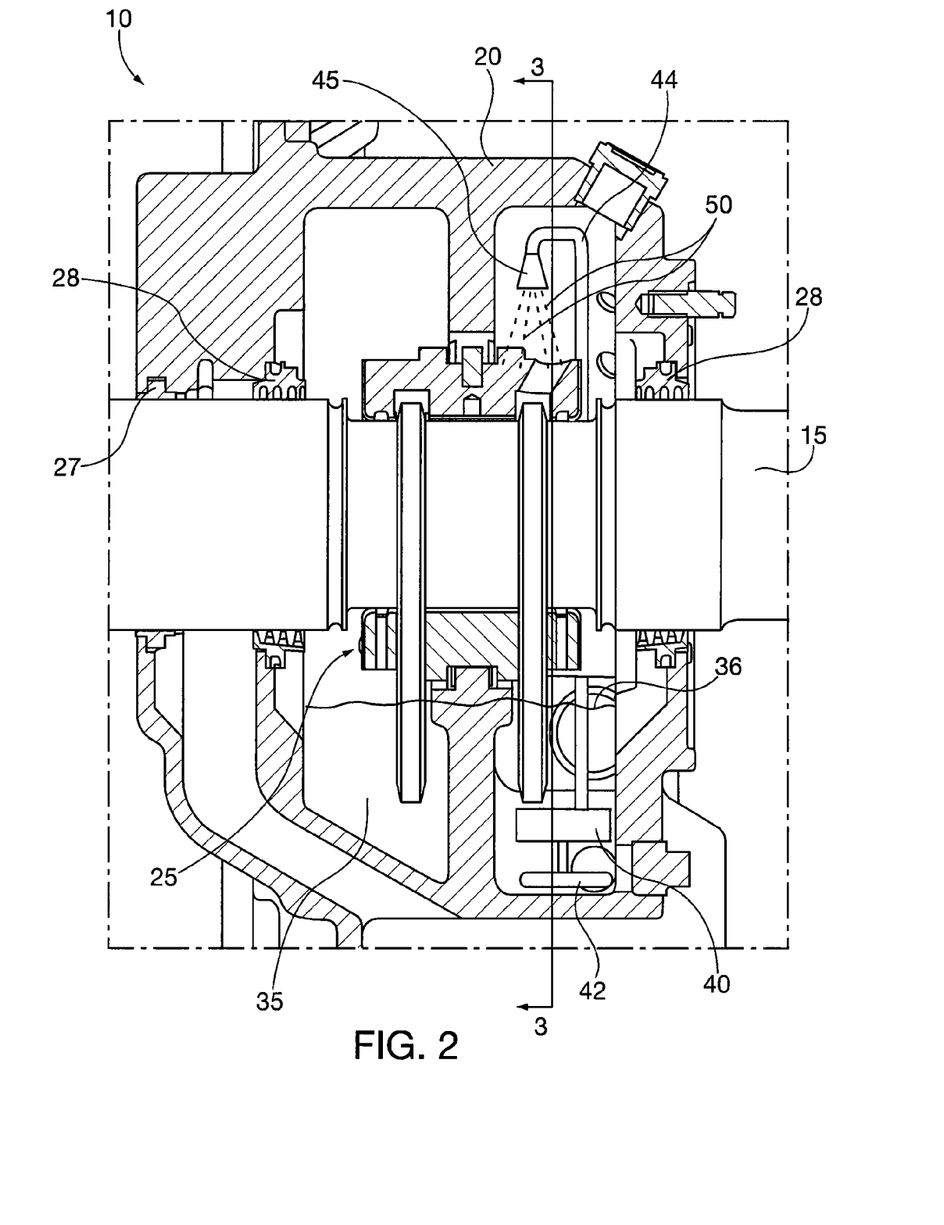
FIG. 2 is a partial axial cross section of the bearing lubrication system of the present invention, focused on the induction motor bearing housing.
Figure 3:
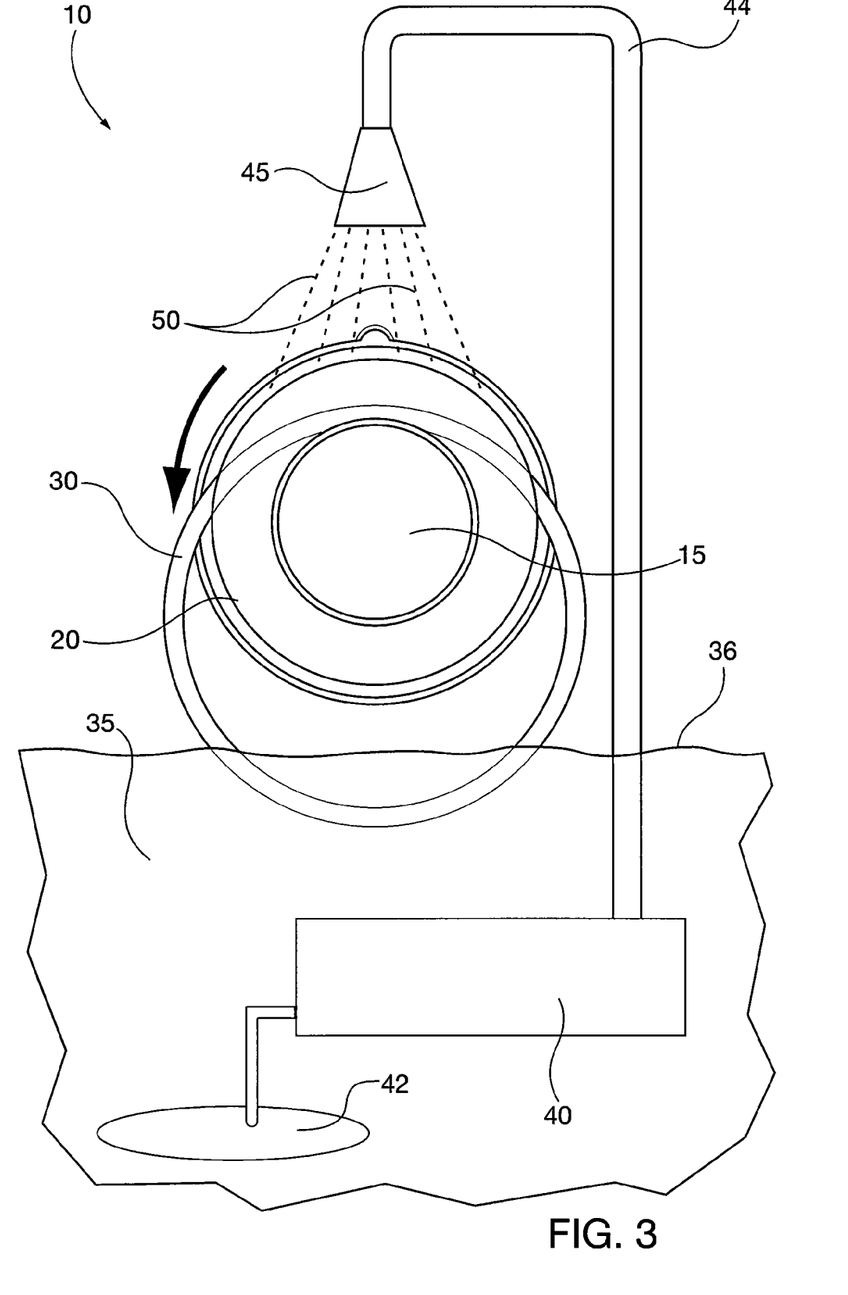
FIG. 3 is a schematic partial radial cross section of the bearing lubrication system of the present invention of FIG. 1.

Referring to FIGS. 1-3, the motor shaft 15 is retained in a bearing housing 20 that includes known hydrodynamic journal bearing 25. The a shaft 15 journal surface is oriented proximally to, but in operation does not contact the bearing 25 surface, as a self-sustaining, self-pressurizing oil film separates the two components while they are in relative motion. Oil is isolated from the electrodynamic components in the interior of the motor 10 by known design air seal 27. A pair of known elastomeric labyrinth seals 28 flank the bearing 25 and corresponding shaft 15 journal surface to inhibit oil flow out of the bearing region axially along the shaft, and to retain a reserve of oil for replenishment of the oil film formed between the bearing and journal corresponding surfaces. As is known in the art, oil surrounding those corresponding surfaces also provides a heat transfer mechanism away from the bearing zone. To this end, other components cooperating with hydrodynamic journal bearing deliver a renewed oil supply to the bearing.

A known hydrodynamic bearing oil delivery mechanism is the pair of oil rings 30 shown in FIGS. 1-3. The annular oil rings 30 are axially restrained by the bearing assembly 25, and capture the motor shaft journal within their respective inner cylindrical surfaces. Each oil ring 30 is in direct contact with the motor shaft journal at the ring's approximately 12 o'clock upper position. The lower portion of the oil ring proximal its 6 o'clock lower position is dipped into oil within the motor's internally defined oil sump 30. The oil sump fill level 36 is schematically depicted, and is below the lower 6 o'clock surface of the rotating shaft 15 and bearing assembly 25 so as not to whip or foam the oil, or cause unwanted rotating drag on the shaft. Motor shaft 16 rotation imparts oil ring 30 rotation. As the oil ring 30 rotates, it carries and transports an oil film on its surface from the sump 30 oil and deposits the oil into the bearing 25 as the previously dipped portion rotates from its prior 6 o'clock position to a new 12 o'clock position in contact with the shaft journal. The oil sump fill level 36 will flow to a horizontal level position under the influence of gravity, no matter what the relative orientation of the motor housing. If the motor 10 is installed in a moving object, such as a ship with a rolling deck, it is likely at some rolling orientations that the oil ring 30 will not be dipped into internal sump 30 oil.

The Bearing Lubrication System of the Present Invention

The bearing lubrication system of the present invention provides a parallel oil delivery mechanism to the hydrodynamic bearing 25, and is complimentary to the existing installed oil ring 30 oil delivery system. As shown in FIGS. 1-3, the bearing lubrication system of the present invention has an oil sump pump 40 that is retained within the motor's existing internal oil sump 35 in the bearing housing. It is not intended to modify the existing internal sump 35 structure as anticipated pumping rates and pressure do not require a large pump. Of course as a matter of design choice, one may choose to locate the pump external the motor's existing sump structure or add additional external auxiliary pumps in parallel to the internal sump pump 40. The sump pump 40 conveniently may be electric powered and have variable pumping capacity rates. Power for the pump 40 may be routed into the motor housing internal sump 35 through one of the existing fitting locations or a new aperture may be added in design revisions.

Sump pump 40 has an oil intake 42 in communication with oil retained in the oil sump 35. Preferably the pump intake 42 is oriented in the sump 35 in a position most likely to be below the oil fill line 36 under any or most foreseen motor 10 orientations, if the motor is installed in a moving object. Though not shown in the figures herein, the pump intake 42 can be mounted to the pump with a two or three degree of motion swivel joint, so that it remains plumb with and below the oil fill line 36 during pump motion when installed on a moving object. Alternatively for motor applications in moving objects, the pump oil intake 42 may be constructed with a check valve up stream of a smaller reserve supply of oil retained in the intake if it loses continuous fluid communication with sump oil by being above the sump oil fill line 36 during some transient orientations of the motor 10.

The sump pump 40 generates a pressurized oil discharge that is routed through discharge line 44, the distal outlet of which is oriented proximal the bearing 25, as shown in FIGS. 1-3, so that the discharge is directed to cause oil to contact directly or flow into the bearing and shaft 16 journal interface. The discharge line may be constructed of any desired rigid or flexible pipe or tubing, and is fixed to the motor 10 housing by any chosen fastener or bracket structure familiar to those skilled in the art. An oil nozzle 45 or other fluid spray pattern regulating component may be coupled to the distal end of the discharge line 44 to alter the oil discharge spray pattern. One skilled in the art may choose to substitute other components for the nozzle 45, for example an orifice, pulsed injector or aerator, in order to achieve other desired oil spray patterns for a particular application.

In operation, the parallel or auxiliary lubrication system of the present invention enables reliable oil distribution to the shaft 16 journal and bearing 25 oil film interface under any motor 10 load or speed operating conditions, whether or not the existing oil rings 30 are in fluid communication with oil in the motor's oil sump 35. The electric sump pump 40 oil flow rate may be selectively adjusted based on anticipated motor 10 operating parameters or in reaction to sensed operating conditions. Unlike oil rings 30 alone that may not be able to deliver desired oil flow rates to the bearing 25 under low speed, high load or high speed operating conditions, the parallel electric sump pump 40 oil discharge flow rate through the pump nozzle 45 may be adjusted as necessary to meet bearing operational needs. The sump pump 40 lubrication system of the present invention is also advantageous to assure reliable oil delivery to the bearings 25 when the motor 10 is operating in a moving vehicle, should the oil rings 30 lose contact with oil in the internal sump 35.

Figure 4:
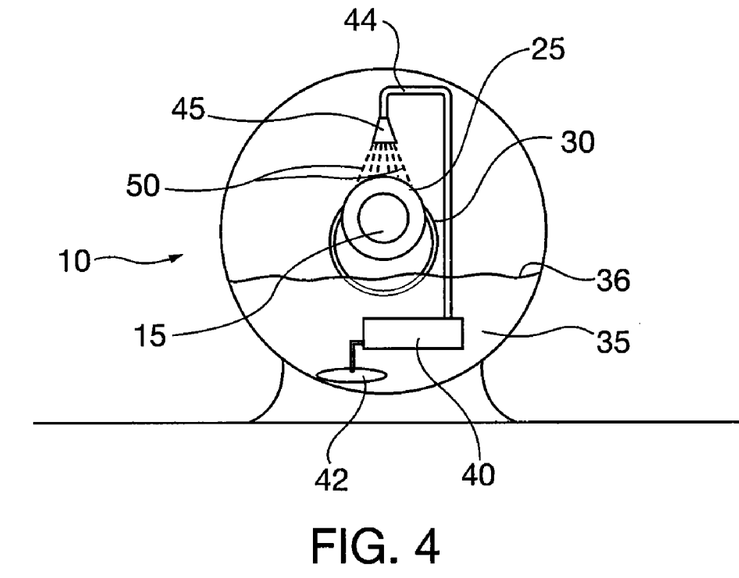
FIG. 4 is a schematic view of an induction motor incorporating the bearing lubrication system of the present invention, showing the motor in a generally level, horizontal position.
Figure 5:
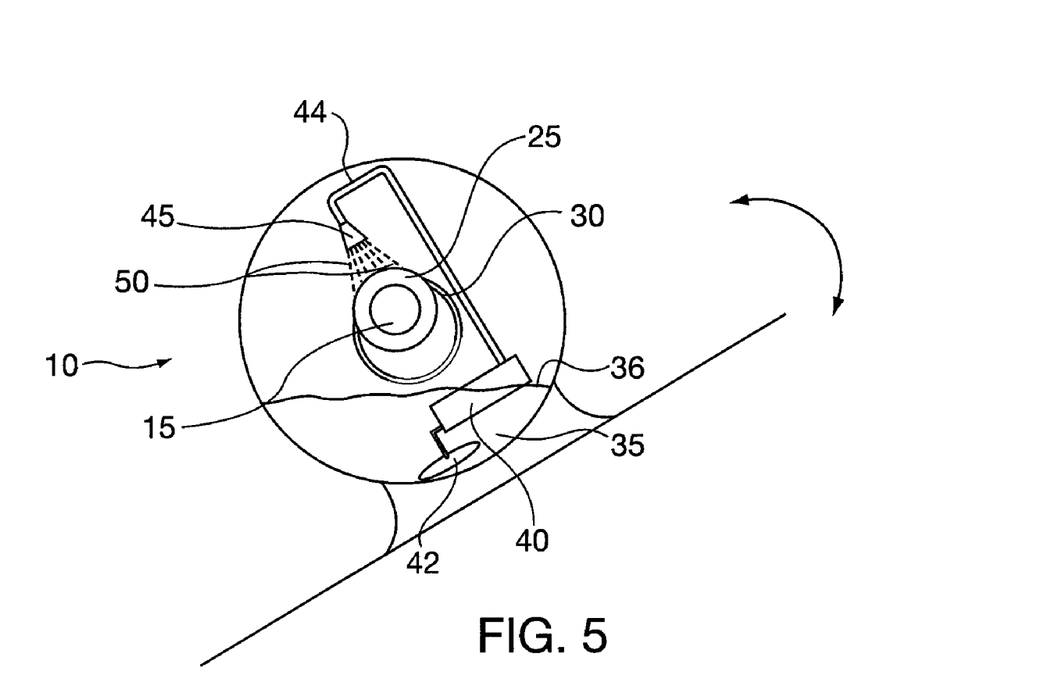
FIG. 5 is a schematic view of an induction motor incorporating the bearing lubrication system of the present invention, showing the motor in a rolled position about the shaft axis relative to the horizontal position of FIG. 4.
Figure 6:
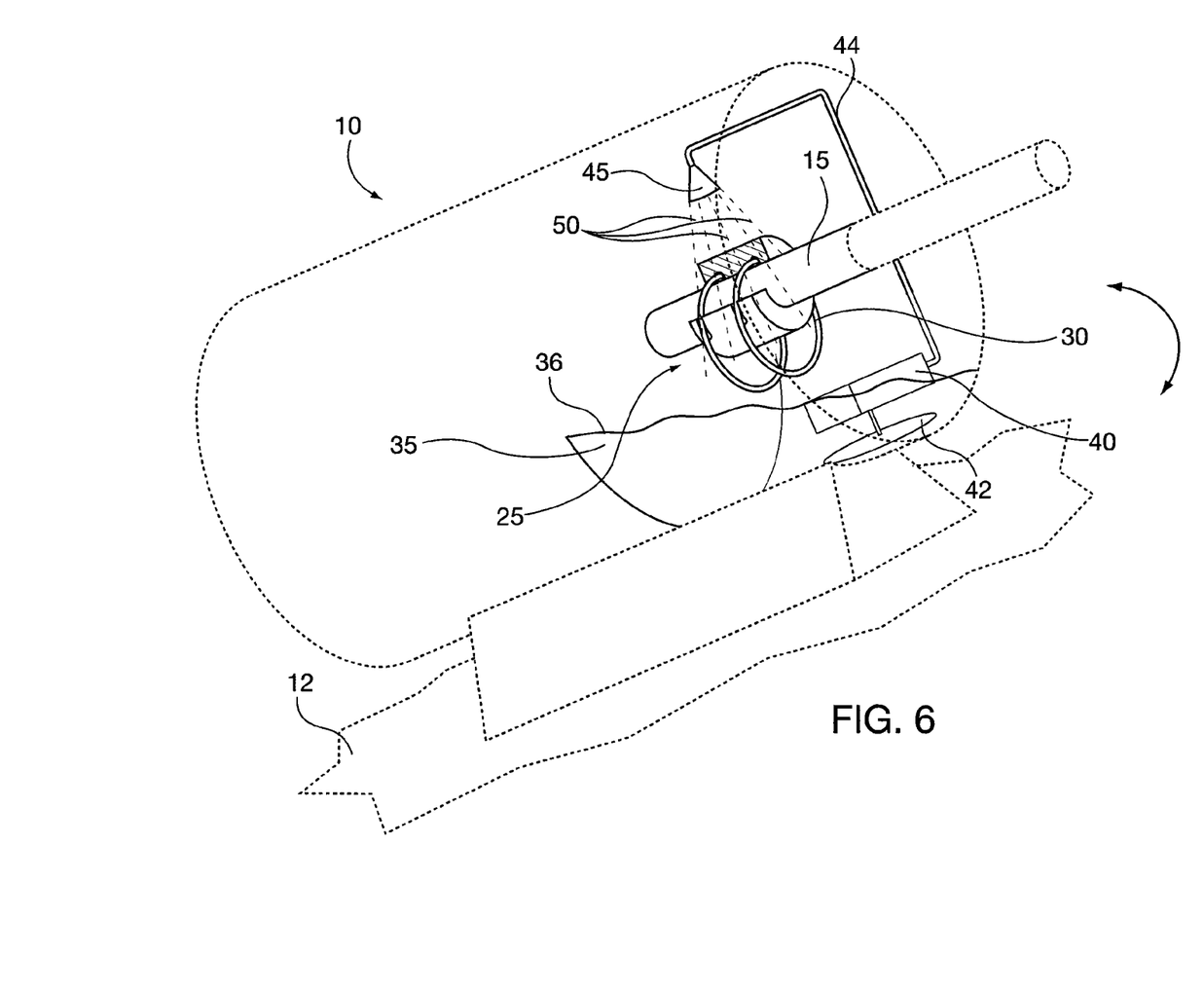
FIG. 6 is a schematic view of an induction motor incorporating the bearing lubrication system of the present invention, showing the motor in a pitched position about the shaft axis relative to the horizontal position of FIG. 4.

FIGS. 4-6 show advantages of employing the lubrication system of the present invention in moving objects. In FIG. 4, the motor 10 is mounted on a deck, such as a ship deck 12, in a generally horizontal position, as noted by the X-Y-Z horizontal reference axes. When the motor 10 is oriented horizontally the sump oil fill line 36 is parallel with the deck 12. The oil rings 30 are generally plumb with the deck 12 and are dipped into the oil below the fill line 36. The lubrication system of the present invention is discharging oil spray 50 onto the bearing 25 in parallel with oil that is being deposited by the oil rings 30. If desired, the electric sump pump 40 may be de-energized, stopping the oil spray 50, with the bearing 25 lubrication being supplied solely by the oil rings 30.

Referring now to FIGS. 5 and 6, the deck 12 rolls and pitches, respectively, relative to the X-Y-Z horizontal reference axes. The oil rings 30 are not in continuous fluid communication with oil in the oil sump 35 because they are above the oil fill line 36. In such situations, the lubrication system of the present invention maintains oil spray 50 on the bearings 25, so that the bearings receive the flow rate that they need for desired operational performance.

Figure 7:
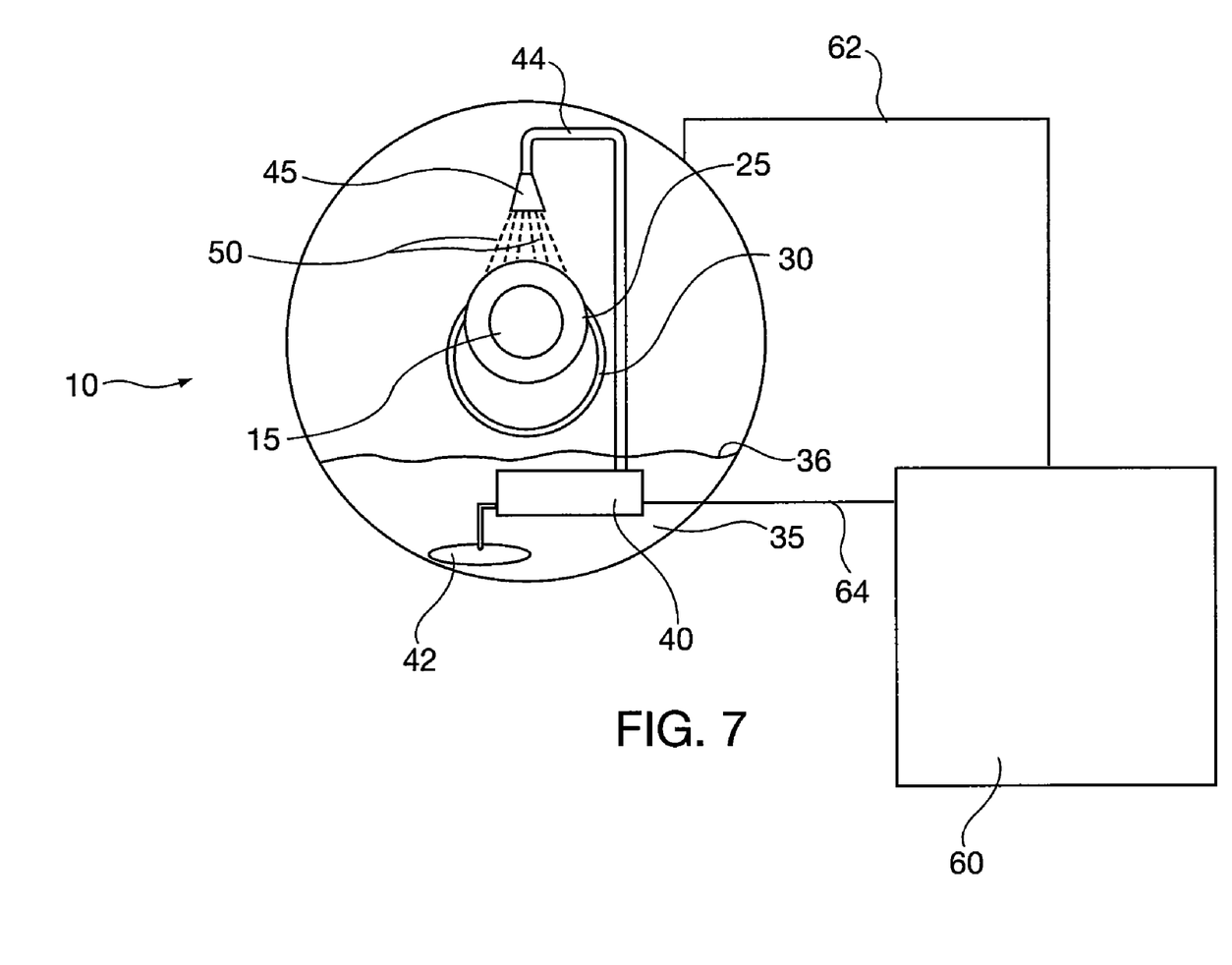
FIG. 7 is a schematic view of an induction motor incorporating the bearing lubrication system of the present invention, coupled to a motor drive control, for varying lubrication system flow parameters.

As previously noted, the lubrication system of the present invention enables a motor operator to vary oil delivery rate to the motor bearings 25. In FIG. 7, an exemplary motor 10 is coupled to a known motor drive controller 60 via communications pathway 62 in known fashion. The drive controller 60 is capable of altering the motor operating parameters, such as speed, torque, and responses to varying loads on the motor 10. Known drive controllers 60 are also capable of monitoring motor operating conditions such as stator winding current and temperature, oil sump temperature, etc. It is contemplated as part of the present invention that the electric oil sump motor 40 may be coupled to the motor drive controller 60, so that the latter may vary the sump pump flow rate, pressure and operating cycle (i.e., continuous, fluctuating or intermittent operation) based on motor operating parameters or in reaction to sensed variations in motor operating parameters.

The lubrication system of the present invention may be incorporated in new induction motors or other electrodynamic machines that have hydrodynamic or rolling element bearings by installing the sump pump 40 and its oil intake 42 within the motor's existing oil sump, or externally installing the pump with its intake in communication with the motor's internal and/or external oil supply reservoir. The sump pump 40 discharge line 44 and nozzle may be located anywhere within or outside the motor housing that enables the nozzle to discharge oil spray 50 on the bearing 25, so that lubricant is deposited where needed in the bearing. The lubrication system component sump pump 40 with intake 42, discharge line 44 and nozzle 45 may be easily field or shop retrofitted into existing installed motors.

Although various embodiments which incorporate the teachings of the present invention have been shown and described in detail herein, those skilled in the art can readily devise many other varied embodiments that still incorporate these teachings.

What is claimed is:

1. An induction, motor comprising:
   a housing including therein: an internal oil sump, at least one oil ring hydrodynamic bearing without a pressurized oil feed system, the oil ring thereof in fluid communication with oil in the internal oil sump, and a rotatable shaft defining at least one journal in rotatable engagement with the bearing;
   an electrically powered oil sump pump oriented within the internal oil sump;
   an oil intake coupled to the oil sump pump that is in fluid communication with oil in the internal sump;
   an oil discharge line external and independent from the bearing, having a proximal end coupled to the sump pump discharge and a distal end for discharge of oil therefrom, the discharge line oriented proximal the motor bearing so that oil discharged therefrom replenishes oil in the bearing and shaft journal interface.

2. The induction motor of claim 1, further comprising a fluid spray pattern regulating component coupled to the oil discharge line distal end, for generating an oil discharge spray pattern on the bearing.

3. The induction motor of claim 1, wherein the electric oil sump pump has a variable flow rate.

4. The induction motor of claim 3, wherein the oil sump pump variable flow rate is controlled by a motor controller coupled to the oil sump pump that also controls motor operation.

5. The induction motor of claim 1, wherein the of intake is in continuous fluid communication with oil in the internal sump when the motor is in motion on a moving object.

6. A kit of parts for a lubrication system adapted for retrofit installation in an electrodynamic machine having a housing including therein: an internal oil sump, at least one bearing without a pressurized oil feed system, and a rotatable shaft defining at least one journal in rotatable engagement with the bearing, comprising:
   an electrically cowered oil sump pump adapted for placement within the internal oil sump;
   an oil intake coupled to the oil sump pump adapted for fluid communication with oil in the internal sump;
   an oil discharge line having a proximal end coupled to the sump pump discharge and a distal end for discharge of oil therefrom, the discharge line adapted for or external and independent from and proximal to the motor bearing so that oil discharged therefrom replenishes oil in the bearing and shaft journal interface.

7. The lubrication system kit of parts of claim 6, further comprising a fluid spray pattern regulating component coupled to the discharge line distal end, for generating an oil discharge spray pattern on the bearing.

8. The lubrication system kit of parts of claim 6, wherein the electric of sump pump has a variable flow rate.

9. The lubrication system kit of parts of claim 8, wherein the oil sump pump is adapted to be coupled to and the variable flow rate is controlled by a motor controller that also controls motor operation.

10. The lubrication system kit of parts of claim 6, adapted for retrofit installation in an induction motor having oil ring hydrodynamic bearings that replenish oil from the internal oil sump.

11. The lubrication system kit of parts of claim 6, wherein the oil intake is adapted for continuous fluid communication with oil in the internal sump when the motor is in motion on a moving object.

12. A method for lubricating an induction motor having a housing including therein: an internal oil sump, at least one bearing without a pressurized oil feed system, and a rotatable shaft defining at least one journal in rotatable engagement with the bearing, comprising:
    installing an electrically powered oil sump pump within the internal oil sump;
    orienting an oil intake coupled to the oil sump pump in the internal oil sump for continuous fluid communication with oil therein when the motor is in motion on a moving object;
    installing an oil discharge line in the motor housing external the motor bearing, having a proximal end coupled to the sump pump discharge and a distal end for discharge of oil therefrom; and
    orienting the oil discharge line distal end proximal the motor bearing so that oil discharged therefrom replenishes oil in the bearing and shaft journal interface.

13. The method of claim 12, further comprising:
    coupling a fluid spray pattern regulating component on the discharge line distal end and regulating oil discharge spray pattern emanating therefrom.

14. The method of claim 12, further comprising:
    selectively varying oil discharge flow rate with the oil sump pump in response to changes in motor operational parameters or operating conditions.

15. The method of claim 14, further comprising: controlling oil discharge varying flow rate with a motor drive controller coupled to the motor and the of sump pump.

16. The method of claim 12, wherein the induction motor has oil ring hydrodynamic bearings that replenish oil from the internal oil sump and the recited method is practiced in parallel therewith.

17. An electrodynamic machine comprising:
    a housing including therein: an internal oil sump, at least one oil ring hydrodynamic bearing without, a pressurized oil feed system, the oil ring thereof in fluid communication with oil in the internal oil sump, and a rotatable shaft defining at least one journal in rotatable engagement with the bearing;
    an electrically powered oil sump pump oriented within the internal oil sump;
    an oil intake coupled to the oil sump pump that is in fluid communication with oil in the internal sump;
    an, oil discharge line external and independent, from the bearing, having a proximal end coupled to the sump pump discharge and a distal end for discharge of oil therefrom, the discharge line oriented proximal the motor bearing so that oil discharged therefrom replenishes oil in the bearing and shaft journal interface.

18. The electrodynamic machine of claim 17, further comprising a fluid spray pattern regulating component coupled to the oil discharge line distal end, for generating an oil discharge spray pattern on the bearing.

19. The electrodynamic machine of claim 17, wherein the electric oil sump pump has a variable flow rate.

20. The electrodynamic machine of claim 19, wherein the oil sump pump variable flow rate is controlled by a motor controller coupled to the oil sump pump that also controls motor operation.

* * * * *